United States Patent Office 3,812,057
Patented May 21, 1974

3,812,057
REGENERATION OF COBALT-MOLYBDENUM CATALYST USED FOR THE REMOVAL OF DIOLEFINS AND ACETYLENES FROM AN OLEFINIC FEED
Johnathan D. Morgan and Roy A. Ramsey, Borger, Tex., assignors to Phillips Petroleum Company, Bartlesville, Okla.
No Drawing. Filed Jan. 3, 1972, Ser. No. 215,156
Int. Cl. B01j 11/30, 11/02
U.S. Cl. 252—416                                   1 Claim

ABSTRACT OF THE DISCLOSURE

A regenerated cobalt-molybdenum catalyst is cooled, contacted with steam and therafter purged with a purging gas for improving the operation of the catalyst.

In the use of a cobalt-molybdenum catalyst for removal of diolefins and acetylenes from an olefinic feedstock, initial use for regeneration generally destroys a sometimes large volume of feedstock and sometimes portions of the catalyst owing to the fact that said regenerated catalyst is excessively active.

This invention therefore resides in cooling the regenerated catalyst, passing a stream of steam into contact with the catalyst and purging the catalyst for lowering the activity of the catalyst and providing a catalyst which during the use thereof will be sufficiently active to remove diolefins and acetylenes with negligible destruction of olefinic feedstock passing in contact therewith.

The cobalt-molybdenum catalyst can be regenerated in any manner known in the art. One example method is described in U.S. Pat. No. 3,456,029. In a preferred method, the reactors are taken off the line and burned out with a steam-air mixture. After the catalyst is steam cooled to a temperature in the range of about 200–400° F., preferably about 300° F., the catalyst is reduced with ½ to 2 million s.c.f.d. if sour hydrogen per 4,250 pounds of catalyst preferably about 1 million s.c.f.d. per 4,000–5,000 pounds of catalyst. Flow of the sour hydrogen is initiated at about the temperature of the cooled catalyst preferably 300° F. and increased 50° F. to 100° F. per hour to a temperature in the range of about 500° F. to about 750° F. preferably 650° F. at which temperature the sour hydrogen is passed through the catalyst for a period of time of about 10 to about 50 hours preferably about 30 hours. The catalyst is thereafter cooled to a temperature in the range of about 425° F. to about 275° F. by passing sour hydrogen through and in contact with the catalyst.

The cobalt-molybdenum catalyst can be prepared by applying 0.5–10 percent by weight, preferably 1–5 percent by weight, of cobalt oxide to a molybdenum catalyst prepared by applying 3–28 percent by weight, preferably 5–15 percent by weight, of molybdenum oxide to a carrier, such as diatomaceous earth, alumina, silica alumina, and the like. These catalysts are known in the art.

In the method of this invention, the regenerated catalyst is cooled preferably to a temperature in the range of about 425° to about 275° F. This temperature is convenient for the steam treating step as it is the temperature used in subsequent impurity-removal operation. A higher temperature, say 500° F., may be used but then the catalyst must be cooled before normal operations are resumed. Temperature should not be much lower than 300° F. because of the possibility of free water contamination of the catalyst.

The stream of steam is passed through and in contact with the catalyst bed. It is preferred that the steam be in the range of about 200 p.s.i.g. to about 275 p.s.i.g. steam. The utilization of lower and higher pressures steams is generally to be avoided for reasons given regarding catalyst cool-down.

It is also preferred that the catalyst be contacted with the steam stream for a period in the range of about 1 to about 10 minutes, more preferaby from 2 to 5 minutes. Contacting the catayst with steam for less than about 1 minute is undesirable because insufficient tempering of the catalyst's activity is obtained whereas a contact time in excess of about 10 minutes gives excessive tempering or too much loss of activity.

It is further preferred that the steam be passed through the catalyst at a weight ratio of about 0.1 to 1.0 pound per pound of catalyst, more preferably 0.2 to 0.5 pound of steam per pound of catalyst.

The steam treated, regenerated cobalt-molybdenum catalyst is thereafter purged with a purging gas hereinafter described, as known in the art, for removing the steam therefrom.

By so treating a regenerated cobalt-molybdenum catalyst by the method of this invention, greater feed rates can be initially subjected on the catalyst and the likelihood of "runaways" and the destruction of valuable materials is reduced.

The following is an example of the method of this invention.

EXAMPLE (1) Hydrogenation catalyst:

| Composition: | Wt. percent |
|---|---|
| Co | 1.3 |
| Mo | 0.2 |
| S | 0.5 |
| $SiO_2$ | 0.02 |
| $Al_2O_3$ | 91.0 |
| Surface area m.²/gm. | 275 |

Catalyst supplier: Girdler Co., Louisville, Ky.

(2) Process: Acetylenes reduction of olefinic alkylation feed.

(3) Reactors: Two reactors each containing 4,500 lbs. of catalyst, one in service and one in regeneration.

Effluents from propane cracking units and from ethane cracking units constitute typical feedstocks to the purification reactors as follows:

(4) Reactor feeds:

| Constituents: | Propane cracking, mol percent | Ethane cracking, mol percent |
|---|---|---|
| $H_2$ | 18.8 | 28.0 |
| $N_2$ | 0.4 | 4.0 |
| CO | 0 | 0.7 |
| Methane | 33.3 | 22.7 |
| Ethylene | 28.4 | 24.7 |
| Ethane | 12.5 | 13.9 |
| Propylene | 3.6 | 0.7 |
| Propane | 2.4 | 0.2 |
| Acetylene | (1) | (2) |
| Propylene | 500 | |
| Butane + | 2,700 | |
| Sulfur | 20 | 20 |

[1] 1,200 p.p.m.
[2] 500 p.p.m.

NOTE.—Feed rate, 400,000–500,000 s.c.f.h.; reactor pressure, 630 p.s.i.g.; reactor inlet, 130° F.; reactor outlet, 160° F.

Regeneration

The reactors were taken off the line and burned out with a steam-air mixture. After the catalyst was steam cooled to 300° F. said catalyst was reduced with 1.0 million s.c.f.d. of sour hydrogen with flow initiated at 300° F. and the temperature increased 50° F. to 100° F. per hour to a temperature of 650° F. at which temperature 1.0 million s.c.f.d. of sour hydrogen was passed through the catalyst for 30 hours. The catalyst was thereafter cooled to 400° F. by passing sour hydrogen through and in contact with the catalyst. 240 p.s.i.g. (400° F.) steam was then passed through the catalyst for a period of 2-3 minutes. After the steam treatment of this invention, the catalyst was purged with purge gas as hereinafter described and placed back on stream.

The sour hydrogen used for catalyst reduction and for cooling the catalyst was as follows:

| Constituent | Mole percent |
|---|---|
| Hydrogen | 93.80 |
| $H_2S$ | 0.40 |
| Methane | 1.32 |
| Ethane | 0.83 |
| Propane | 0.48 |
| Isobutane | 0.07 |
| n-Butane | 0.05 |
| Isopentane | 0.01 |
| n-Pentane | 0.05 |
| Cyclopentane | 0.20 |
| 2,2-dimethylbutane | 0.05 |
| 2,3-dimethylbutane | 0.11 |
| 2-Methylpentane | 0.67 |
| 3-Methylpentane | 0.45 |
| n-Hexane | 0.73 |
| MCP | 0.41 |
| Benzene | 0.07 |
| 2,4-dimethylpentane | 0.01 |
| Cyclohexane | 0.12 |
| Heavies | 0.17 |

The purge gas was as follows:

| Constituent | Mole percent |
|---|---|
| Hydrogen | 1.2 |
| Methane | 20.8 |
| Ethylene | .7 |
| Ethane | 64.1 |
| Propane | 10.1 |
| Isobutane | 2.7 |
| n-Butane | .4 |

By treating the regenerated catalyst by the method of this invention, relative to catalysts without the regeneration treatment of this invention, the acetylenes content of the treated olefinic stream was reduced from about 300 to 400 p.p.m. in the prior system to 200 p.p.m. by our invention, a significant reduction. The absence of "runaway" reactions during initial operation of the regenerated catalyst as evidenced by no localized "hot-spots" also assured a longer life for the catalyst. The absence of "hot-spots" also meant a reduction in the undesirable hydrogenation of olefins.

Other modifications and alterations of this invention will become apparent to those skilled in the art from the foregoing discussion and example, and it should be understood that this invention is not to be unduly limited thereto.

What is claimed is:

1. A method for regenerating a silica-alumina supported cobalt-molybdenum catalyst, used in the removal of diolefins and acetylenes from an olefinic feedstock, comprising:

passing a steam-air mixture through the catalyst to burn out the catalyst;

passing steam through the catalyst to cool said catalyst to a temperature in the range of about 200-400° F.;

passing sour hydrogen through the catalyst while increasing the temperature of the sour hydrogen, said sour hydrogen temperature being increased at the rate of about 50° to about 100° F. per hour to a temperature in the range of about 500° F. to about 750° F.;

continuing to pass sour hydrogen through the catalyst at a temperature in the range of about 500° F. to about 750° F. for a period in the range of about 10 to about 50 hours;

passing sour hydrogen through the catalyst to cool said catalyst to a temperature in the range of about 425° F. to about 275° F.;

passing a stream of steam through the catalyst for a period in the range of about 1 to about 10 minutes, said steam being in the range of about 200 to about 275 p.s.i.g. and in a weight ratio in the range of about 0.1 to about 1.0 pound of steam per pound of catalyst; and purging the catalyst with a purging gas.

References Cited
UNITED STATES PATENTS

| | | | |
|---|---|---|---|
| 3,068,303 | 12/1962 | Pattison | 260—677 H |
| 3,205,281 | 9/1965 | Fleming | 260—677 H |
| 2,735,879 | 2/1956 | Redcay | 260—677 H |
| 3,456,029 | 7/1969 | Morita et al. | 260—677 H |
| 3,152,193 | 10/1964 | Fleming et al. | 260—677 H |
| 2,814,653 | 11/1957 | Hogan et al. | 260—677 H |

DANIEL E. WYMAN, Primary Examiner

P. E. KONOPKA, Assistant Examiner

U.S. Cl. X.R.

252—420; 260—677 H